United States Patent
Tirapu Azpiroz et al.

(10) Patent No.: US 11,366,943 B2
(45) Date of Patent: Jun. 21, 2022

(54) PLATFORM FOR DESIGN AND PROTOTYPING OF MICRO PAPER BASED DEVICES

(71) Applicant: INTERNATIONAL BUSINESS MACHINES CORPORATION, Armonk, NY (US)

(72) Inventors: Jaione Tirapu Azpiroz, Rio de Janeiro (BR); Ademir Ferreira da Silva, Sao Paulo (BR); Matheus Esteves Ferreira, Rio de Janeiro (BR); Ricardo Luis Ohta, Sao Paulo (BR); Mathias B. Steiner, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

(21) Appl. No.: 16/445,142

(22) Filed: Jun. 18, 2019

(65) Prior Publication Data
US 2020/0401670 A1 Dec. 24, 2020

(51) Int. Cl.
*G06F 30/20* (2020.01)
*G06F 113/24* (2020.01)
(Continued)

(52) U.S. Cl.
CPC ............ *G06F 30/20* (2020.01); *B01L 3/5027* (2013.01); *B01L 9/527* (2013.01);
(Continued)

(58) Field of Classification Search
None
See application file for complete search history.

(56) References Cited

U.S. PATENT DOCUMENTS 6,500,323 B1 * 12/2002 Chow .............. G01N 27/44791
204/450
8,458,626 B1 * 6/2013 Tirapu-Azpiroz ........ G03F 1/36
716/54
(Continued)

FOREIGN PATENT DOCUMENTS

WO  2017/176970 A1  10/2017

OTHER PUBLICATIONS

"An Open Software Platform for the Automated Design of Paper-Based Microfluidic Devices" by Nicholas S. DeChiara et al, www.nature.com/scientificreports; Scientific REPOrtS | 7: 16224 | DOI:10.1038/s41598-017-16542-8 pp. 8. (Year: 2017).*
(Continued)

*Primary Examiner* — Akash Saxena
(74) *Attorney, Agent, or Firm* — Intelletek Law Group, PLLC; Gabriel Daniel, Esq.

(57) ABSTRACT

A computer-implemented method, computer program product and prototyping platform creates a design blueprint for a substrate-based microfluidic device. A design and prototyping platform receives at least one blueprint parameter and at least one constraint associated with a proposed substrate-based microfluidic device including a hydrophilic material and arrangement of a pattern of a hydrophobic material. The platform determines an arrangement of a plurality of microfluidic device elements as candidates for implementation of the proposed substrate-based microfluidic device and outputs a design blueprint of the proposed substrate-based microfluidic device.

18 Claims, 18 Drawing Sheets

(51) Int. Cl.
*G06F 119/18* (2020.01)
*G06F 111/04* (2020.01)
*G06F 111/20* (2020.01)
*B01L 3/00* (2006.01)
*B01L 9/00* (2006.01)

(52) U.S. Cl.
CPC ... *B01L 2200/027* (2013.01); *B01L 2300/126* (2013.01); *G06F 2111/04* (2020.01); *G06F 2111/20* (2020.01); *G06F 2113/24* (2020.01); *G06F 2119/18* (2020.01)

(56) References Cited

U.S. PATENT DOCUMENTS

| | | | | |
|---|---|---|---|---|
| 8,628,729 | B2 | 1/2014 | Carrilho et al. | |
| 9,346,048 | B2* | 5/2016 | Zhou | B01L 3/502746 |
| 9,892,225 | B2* | 2/2018 | Tirapu Azpiroz | G06F 30/20 |
| 10,360,336 | B2* | 7/2019 | Brisk | B81C 99/006 |
| 2002/0108096 | A1* | 8/2002 | Lee | G06F 30/18 |
| | | | | 716/30 |
| 2002/0108097 | A1* | 8/2002 | Harris | B01L 3/502707 |
| | | | | 703/9 |
| 2004/0260418 | A1* | 12/2004 | Staats | B01L 3/502707 |
| | | | | 700/97 |
| 2005/0149304 | A1* | 7/2005 | Harris | G06F 30/18 |
| | | | | 707/999.102 |
| 2008/0177518 | A1* | 7/2008 | Krishnamoorthy | G06F 30/20 |
| | | | | 703/9 |
| 2009/0298191 | A1* | 12/2009 | Whitesides | B01L 3/502715 |
| | | | | 436/164 |
| 2011/0111517 | A1* | 5/2011 | Siegel | B01L 3/502707 |
| | | | | 436/164 |
| 2012/0181184 | A1* | 7/2012 | Whitesides | B01L 3/5027 |
| | | | | 205/775 |
| 2012/0198684 | A1* | 8/2012 | Carrilho | B01L 3/502707 |
| | | | | 29/527.1 |
| 2016/0154908 | A1* | 6/2016 | Maddala | G06F 16/212 |
| | | | | 703/1 |
| 2016/0334620 | A1* | 11/2016 | Reboud | B29C 35/02 |
| 2017/0173578 | A1* | 6/2017 | Crooks | G01N 33/66 |
| 2017/0286583 | A1* | 10/2017 | Tirapu Azpiroz | G06F 30/23 |
| 2018/0121590 | A1* | 5/2018 | Brisk | B81C 99/006 |
| 2019/0318054 | A1* | 10/2019 | Hickman | G06F 30/23 |
| 2020/0233995 | A1* | 7/2020 | Yoshida | G06F 30/10 |
| 2020/0282395 | A1* | 9/2020 | Tirapu Azpiroz | B01L 3/502715 |
| 2020/0401670 | A1* | 12/2020 | Tirapu Azpiroz | G06F 30/20 |

OTHER PUBLICATIONS

Nidhin T Madhu et al 2019 IOP Conf. Ser.: Mater. Sci. Eng. 577 012104 (Year: 2019).*

Krishnendu Chakrabarty et al, "Design Tools for Digital Microfluidic Biochips: Toward Functional Diversification and More than Moore", IEEE Transactions on Computer-Aided Design of Integrated Circuits and Systems, vol. 29, No. 7, Jul. 2010, pp. 1001-1017 (Year: 2010).*

Ali Kemal Yetisen et al, "Paper-based microfluidic point-of-care diagnostic devices", The Royal Society of Chemistry 2013 Lab Chip, 2013, 13, pp. 2210-2251 (Year: 2013).*

Tirapu-Azpiroz, J., et al. (2018). Modeling fluid transport in two-dimensional paper networks. Journal of Micro/Nanolithography, MEMS, and MOEMS, 17(2), 025003 (10 pp.). doi:http://dx.doi.org/10.11 (Year: 2018).*

Carrilho, E. et al., "Understanding Wax Printing: A Simple Micropatterning Process for Paper-Based Microfluidics"; Anal. Chem. (2009); vol. 81, pp. 7091-7095.

Lewis, G. C. et al., "High Throughput Method for Prototyping Three-Dimensional, Paper-Based Microfluidic Devices", The Royal Society of Chemistry (2012); 4 pgs.

Mell, P. et al., "Recommendations of the National Institute of Standards and Technology"; NIST Special Publication 800-145 (2011); 7 pgs.

Morbioli, G. G. et al., "Improving Sample Distribution Homogeneity in Three-Dimensional Microfluidic Paper-Based Analytical Devices by Rational Device Design"; Anal. Chem. (2017); vol. 89, pp. 4786-4792.

Potter, J. et al., "Design Automation for Paper Microfluidics with Passive Flow Substrates"; GLSVLSI (2017); Proceedings of the on Great Lakes Symposium on VLSI, Alberta CA, 6 pgs.

Schilling, K. M. et al., "Fully Enclosed Microfluidic Paper-Based Analytical Devices"; Anal. Chem. (2012); vol. 84, pp. 1579-1585.

Tenda, K. et al., "High-Resolution Microfluidic Paper-Based Analytical Devices for Sub-Microliter Sample Analysis"; Micromachines (2016); vol. 7:80; pp. 1-12.

Van Heeren, H. et al.,"Design for Microfluidic Device Manufacture Guidelines", Microfluidics Consortium and supported by the MFmanufacturing Project (2014); Version 5; 24 pgs.

Yetisen, A. K., et al., "Paper-Based Microfluidic Point-of-Care Diagnostic Devices"; The Royal Society of Chemistry (2013); vol. 13, pp. 2210-2251.

* cited by examiner

PLATFORM FOR DESIGN AND PROTOTYPING OF MICRO PAPER BASED DEVICES

BACKGROUND

Technical Field

The present disclosure generally relates to a prototyping software platform to design microfluidic paper based analytical devices.

Description of the Related Art

Substrate-based microfluidic devices are used for chemical and biochemical testing. Paper-based analytical devices (microPADs or μPADs) are a type of microfluidic device that provides a low-cost platform to perform chemical and biochemical tests.

SUMMARY

According to various embodiments, a computer-implemented method, a non-transitory computer readable storage medium, and a prototyping platform for the design and prototyping of micropad devices are provided. A computer-implemented method of creating a design blueprint for a substrate-based microfluidic device by a design and prototyping platform includes receiving at least one blueprint parameter and at least one constraint associated with a proposed substrate-based microfluidic device including a hydrophilic material and arrangement of a pattern of a hydrophobic material. An arrangement of a plurality of microfluidic device elements are determined as candidates for implementation of the proposed substrate-based microfluidic device. A design blueprint of the proposed substrate-based microfluidic device is output.

In one embodiment, a material recommendation tool is configured to analyze a database of substrate materials and associated properties and select a paper type that most closely accommodates the substrate-based microfluidic device, based on the at least one blueprint parameter and the at least one constraint. A fabrication and assembly recommendation tool outputs a design blueprint of the proposed substrate-based microfluidic device.

According to an embodiment of the present disclosure, a non-transitory computer readable storage medium tangibly embodying a computer readable program code having computer readable instructions that, when executed, causes a computer device having a design and prototyping platform to carry out a method of creating a design blueprint of a substrate-based microfluidic device. The method includes receiving at least one blueprint parameter and at least one constraint associated with a proposed substrate-based microfluidic device including a hydrophilic material and a pattern of hydrophobic material. The design and prototyping platform determines an arrangement of a plurality of microfluidic device elements as candidates for implementation of the proposed substrate-based microfluidic device. A design blueprint of the proposed substrate-based microfluidic device is output.

According to an embodiment of the present disclosure, a prototyping platform for creating a design blueprint of a microfluidic paper-based analytical device (micropad), includes a computer-aided design (CAD) tool configured to receive at least one blueprint parameter and at least one constraint associated with a proposed micropad having a number of layers of a hydrophilic material and a pattern of a hydrophobic material thereon. The CAD tool determines an arrangement of a plurality of microfluidic device elements as candidates for implementation of a proposed micropad.

In one embodiment, the prototyping platform includes a material recommendation tool configured to analyze a database of hydrophilic materials and associated properties, and to select a type of hydrophilic material for each layer of the proposed micropad. A simulation and optimization tool is configured to perform a device parameterization of the candidates determined for implementation with the proposed micropad. The simulation and optimization tool is further configured to produce recommendation of microfluidic elements as the candidates determined for implementation of the proposed substrate-based microfluidic device by performing computer flow simulations of liquid transport through porous paper fibers of the hydrophilic paper of the micropad. The simulation and optimization tool is further configured to perform reflow simulation to predict deformation of hydrophobic barriers impregnated in the hydrophilic paper of the micropad and compensate for a size of the hydrophobic barriers provided in the design blueprint of the micropad based on the predicted deformation. A fabrication and assembly recommendation tool is configured to select a sequence of fabrication operations and an assembly recipe for construction of the micropad. The output design blueprint of the proposed substrate-based microfluidic device includes at least one material recommendation, a hydrophobic barrier layout, and a fabrication and assembly recipe.

In one embodiment, the micropad comprises a three-dimensional paper device. The fabrication and assembly recommendation tool is further configured to include in the design blueprint a recommended sequence of fabrication operations and an assembly recipe for construction of the micropad.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
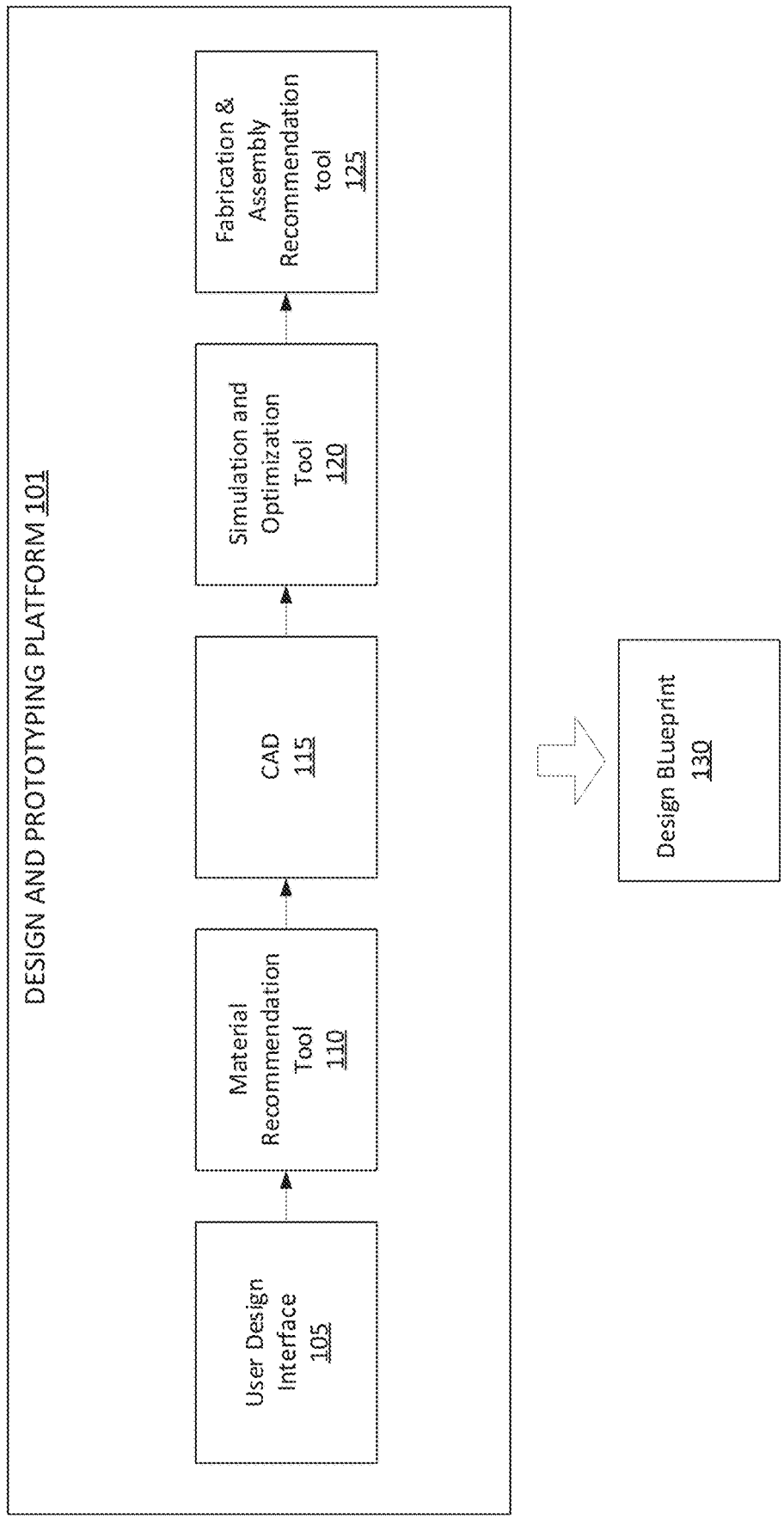
FIG. 1 is a design and prototyping platform of a system, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The term "blueprint" as used throughout the disclosure is to be understood as a planned design or prototype including details for the construction of a microfluidic device. In the case of a paper-based analytical device, such as a micropad, the blueprint includes parameters for construction. A non-limiting example of parameters that may be provided by a system according to the disclosure can include the thickness of the paper, porosity, pore size, brand of paper, etc. In the case of 3D micropads that are constructed of multiple layers of paper, the blueprint may have different specifications for each layer.

In one aspect, the present disclosure provides systems and methods of automated micropad design that considers the effects of the manufacturing process of micropads. For example, the created blueprint in the case of paper-based microfluidic devices provides parameters for arranging hydrophobic barriers on hydrophilic paper to transport fluids to output areas of the micropad that may include chemical or biological reagents where chemical or biological reactions of the fluid with the reagents takes place. Paper-based microfluidic devices rely on the phenomenon of capillary penetration in porous media to transport fluids through the microfluidic device. To control fluid penetration in porous substrates such as paper in two or three dimensions, factors such as pore structure, wettability, and geometry of the microfluidic device are controlled in view of other factors such as viscosity and evaporation rate of the liquid to be tested. The manufacturing process involves the application of a reflow process that uses heat (e.g., a hot press) to melt and impregnate the hydrophilic paper with the wax and create the hydrophobic barriers. During the process, diffusion also occurs on the plane of the paper, slightly deforming and shrinking the hydrophilic paper channels, as the heat used in the process of creating the hydrophobic barriers results in wax reflow into the channels of the micropad.

In one aspect, the present disclosure provides a tool that is configured to predict the deformation of the wax used to create the hydrophobic barriers on the hydrophilic paper and pre-compensates the original wax layout to counter-act this deformation of the wax and produce the desired layout after reflow. The prediction may use pre-loaded lookup tables or a physical model.

By virtue of the concepts discussed herein, in various aspects, the platform for the design and prototyping of micropad devices according to the present disclosure provides an improvement in the operation of computing devices, and an improvement in the design of micropad devices based at least on a more accurate arrangement of hydrophobic barriers that are subject to effects of reflow during the fabrication process, and an improvement in the design of the micropads by application of the simulation and optimization tool comprising a flow simulation workflow, optimization tool workflow and a reflow compensation workflow, and operation of the material recommendation tool and fabrication and assembly recommendation tool to provide a series of recommended materials, fabrication operations and an assembly recipe.

Example Architecture

FIG. 1 illustrates in 100 an example architecture of a design and prototyping platform 101 of a system consistent with an illustrative embodiment. The design and prototyping platform 101 in this example comprises one or more processors or sub-processors configured for creating a blueprint of a microfluidic device. The microfluidic device includes a porous hydrophilic material capable of allowing the movement of fluids, and the type of hydrophilic material includes, but is not limited to, paper. Hydrophobic barriers patterned in paper control the movement of liquids based on channel geometry that can carry the liquid and reagents according to predefined sequences. A channel is referred to a series of connected hydrophilic sections or subchannels, extending from the fluid input to the output, whether they reside on a single paper layer or on several paper layers, and carrying out one of the chemical sequences included in the microfluidic device. Thus hereafter the term channel also references the chemical sequence to which it is associated.

The design and prototyping platform 101, as shown in the non-limiting example of FIG. 1, includes a user interface 105, a material recommendation tool 110, a CAD tool 115, a simulation and optimization tool 120, and a fabrication and assembly recommendation tool 125. It is to be understood that the appended claims may be practiced with variations of the platform 101 having fewer than the aforementioned tools.

The user interface 105, which is optional and may be part of, for example, a CAD tool, is configured to receive at least one blueprint parameter and at least one constraint associated with a proposed substrate-based microfluidic device having a number of layers of hydrophilic substrate and a pattern of a hydrophobic material.

According to this embodiment, some non-limiting examples of blueprint parameters include a number of inputs, a number of outputs, a number of layers, a sample type, a number of processing operations per channel, and the detection type. There may be fewer blueprint parameters, or more blueprint parameters provided than the examples discussed above. In addition, according to this embodiment, some non-limiting examples of constraints may include reagent volume limits, reaction time limits, sample volumes, and total time limits.

Figure 2A:
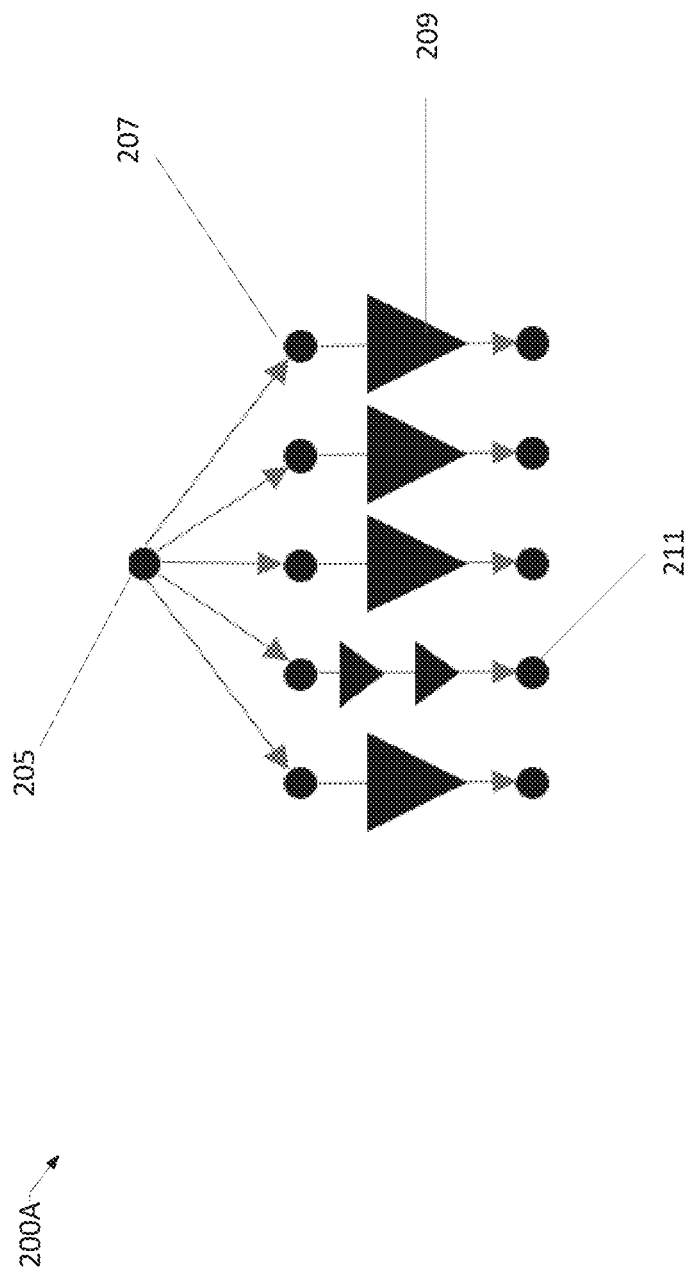
FIG. 2A is a non-limiting example of some blueprint parameters, consistent with an illustrative embodiment.

FIG. 2A provides a non-limiting example of some blueprint parameters 200A, consistent with an illustrative embodiment. In this embodiment, there is shown one fluid input 205 on an input layer, a distribution by five distributors 207 from a distribution layer to an indicator layer where five reactive agents 209 receiving the fluid input, and five outputs 211 on an output layer. In addition to a number of fluid inputs, outputs, etc., the blueprint parameter may include that the input sample is a specific type of bodily fluid such as blood, urine, or in the case of micropads used for analyzing food safety, there may be a sample of the food mixed in an aqueous solution. In the case of water safety, the fluid input would be a sample of the water.

The output may be, for example, colorimetric, fluorescent, electrochemical, to indicate the presence of and/or quantity of a chemical, (e.g., ketones, sugar, a particular hormone, a particularly harmful substance, etc.). The reactive agents may be the same or different reagents that receive the fluid input via specific distributors 207. When redundancy in testing is desired, there may be the same reagent in the same amount. The fluid input 205 may be a sample that is tested for various properties by different reagents. This information may be provided in the blueprint parameter information.

Referring back to FIG. 1, the material recommendation tool 110 is configured to analyze a database of substrate materials and associated properties, and to select an optimum substrate type for each layer of a proposed substrate-based microfluidic device. The material recommendation tool 110 is operatively coupled to a classified materials database 252 (shown in FIG. 2B). In the case of a microfluidic paper-based analytical device (micropad), the material specifications and their classification are used to select the type of paper depending on the blueprint parameters and input constraints, and to populate the flow simulation module and optimization module of the simulation and optimization tool 120 for flow simulations according to a recommendation algorithm.

Table 1 below lists some examples of a classified material database consistent with an illustrative embodiment. As shown above, there is a plurality of classes (e.g., A, B, C, etc.), properties (e.g., slow flow, large volume, uniform pore distribution, number of entries, brand name, pore size, porosity, and thickness).

TABLE 1

Material Database

| Class | Property | ID | Brand name | Pore Size (um) | Porosity | Thickness (um) |
|---|---|---|---|---|---|---|
| A | Slow flow | 124 | Whatman 3MM | 6 | 0.71 | 340 |
| | | 151 | Ahlstrom 950 | 3 | NA | 190 |
| | | 107 | Ahlstrom 237 | 3 | NA | 420 |
| | ... | ... | | | | |
| B | Large volume | 124 | Whatman 3MM | 6 | 0.71 | 340 |
| | | 267 | Filter Paper V+ | NA | NA | 440 |
| | | 107 | Ahlstrom 237 | 3 | NA | 420 |
| | | 214 | CHMLAB Grade F1004 | 22.5 | 0.737 | 210 |
| | ... | ... | | | | |
| C | Uniform pore distr. | 120 | Whatman CHR1 | 11 | 0.678 | 180 |
| | | 124 | Whatman 3MM | 6 | 0.71 | 340 |
| | | 302 | Whatman 17 CHR | 11 | 0.691 | 920 |
| ... | ... | ... | | | | |

Referring back to FIG. 1, the material recommendation tool 110 may recommend, for example, a certain type of filter paper for a fluid input layer due to high wicking speed for fast sample absorption. Another type of paper may be recommended for the reagent layer having increased thickness for larger reagent volume (higher sensitivity), finer pore size (for higher uniformity and slower flow for longer reaction time). Moreover, a third type of paper may be recommended for the output paper because of its uniform pore size distribution for color homogeneity.

Figure 2B:
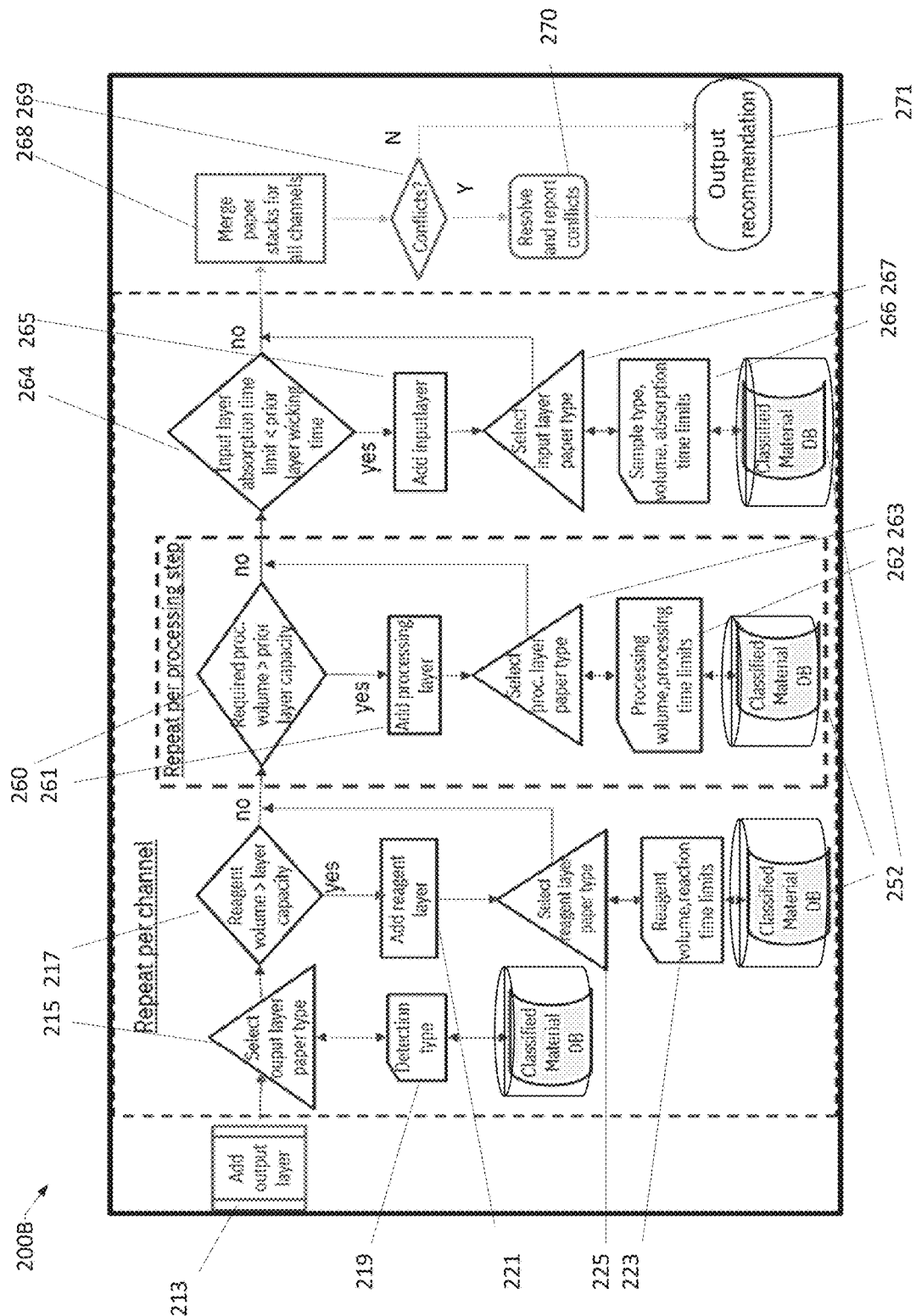
FIG. 2B is a material recommendation engine workflow, consistent with an illustrative embodiment.

FIG. 2B is an illustration of a recommendation workflow engine 200B consistent with an illustrative embodiment. The material recommendation tool 110 in this embodiment operates the recommendation workflow engine 200B to provide an output recommendation 271.

For example, referring to FIG. 2B, an output layer 213 is initialized. Then, for each channel in the microfluidic device associated with a chemical reaction sequence from the fluid input to the output layers, and in conjunction with the classified material database 252, there is a selection of output layer paper type 215 as a function of the detection type 219. At 217 it is determined whether the reagent volume corresponding to the last step in the chemical reaction sequence of the selected channel is greater than the layer's paper type capacity, and if affirmative, a new reagent layer is added 221. The classified material database 252 is analyzed for reagent, volume and reaction time limits 223 and there is a selection of a reagent layer paper type 225. If at 217 the reagent volume is not greater than the layer capacity, at operation 260 it is determined whether the required process volume in the immediate prior processing step assigned to that channel is greater than the prior layer's paper type capacity. If affirmative, a processing layer is added.

Continuing with the method 200B, processing steps in the chemical reaction sequence assigned to each channel are analyzed in reverse order starting from the output layer back to the input layer. Classified material database 252 is again analyzed for processing volume, processing time limits 262 and a new processing layer paper type is selected 263. The method steps from 260 to 263 are then repeated per processing step in the chemical reaction sequence in that channel until the input layer or starting step is reached. At 264, it is determined whether input layer absorption time is less than the prior layer wicking. If affirmative, at 266 the classified material database 252 is analyzed for the sample type, volume, and absorption time limits, 266.

At operation 267, an input layer paper type is selected. Method steps 215 to 267 are repeated for each channel in the microfluidic device blueprint. Once the determination at 264 is reached for all channels and the input layer paper type is selected at 267 for all channels, then at 268 the paper stacks for all channels are merged and checked for conflicts 269. At 270, the conflicts are resolved and/or reported. If there are no conflicts at 269, the information regarding the merged paper stacks for all channels is provided in the output recommendation 271. This output recommendation may comprise a different stack of papers per channel of the microfluidic device, each corresponding to a different chemical reaction sequence; or the output may comprise a single stack of paper types for all channels, where each paper type contains elements of all channel; or the output may present any scenario in between. It will be understood that the aforementioned operation of the recommendation workflow engine 200B of the present disclosure is not limited to operation in the aforementioned example.

Referring again to FIG. 1, the example of the design and prototyping platform 101 includes a computer-aided design (CAD) tool 115 configured to determine a plurality of microfluidic device elements as candidates for implementation with the proposed substrate-based microfluidic device. The CAD tool 115 is configured for microfluidic design and prototyping that includes or is operatively coupled to a library of common microfluidic elements that are editable for final geometry and dimensions.

Figure 2C:
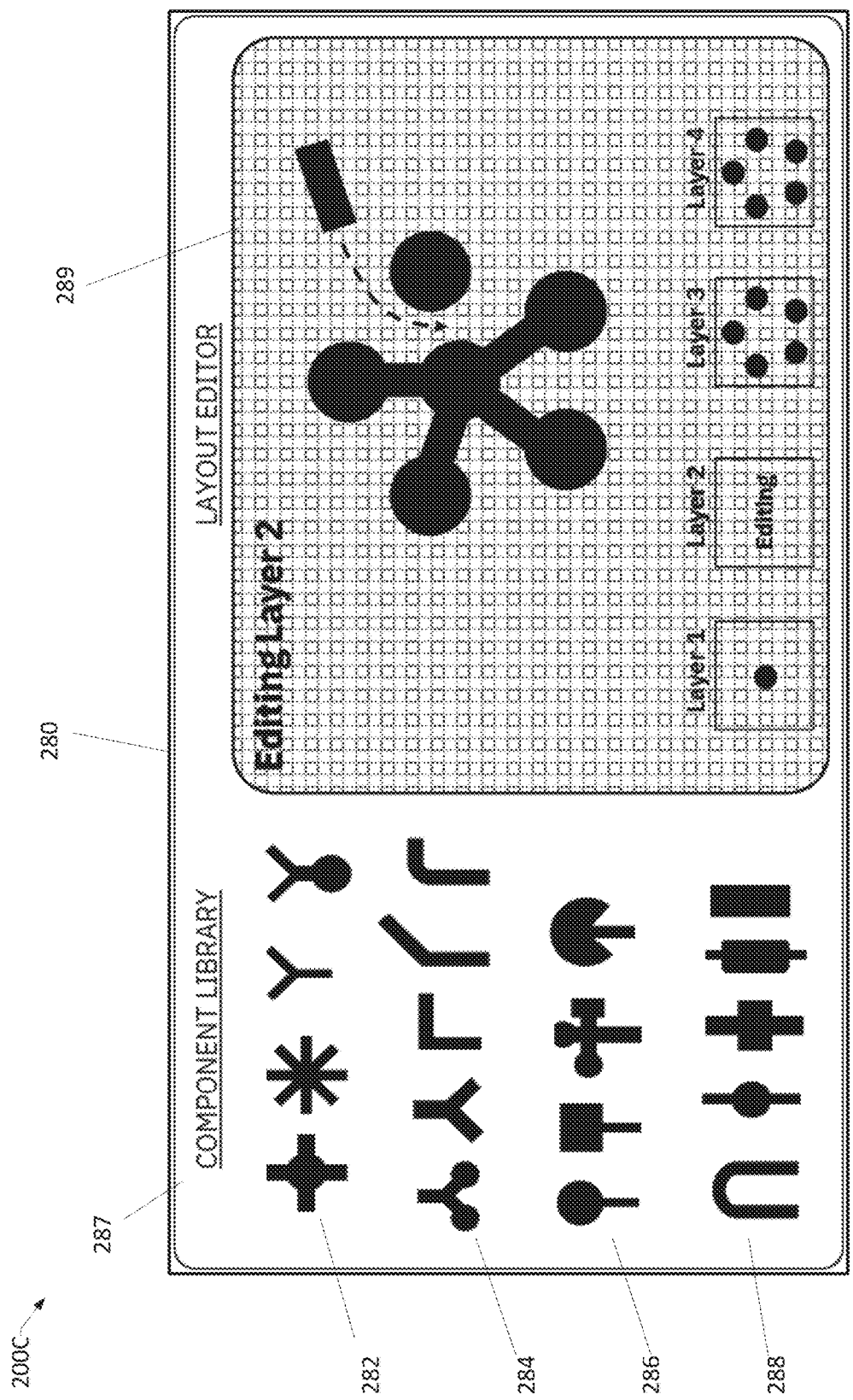
FIG. 2C is an example screenshot of a computer aided design window for micropads, consistent with an illustrative embodiment.

FIG. 2C is an example of a screenshot 200C of a CAD window 280 according to an embodiment of the present disclosure. The CAD tool operates to edit multiple layers of varying material types and dimensions to facilitate alignment of the layers. Some of the micropad elements listed in the component library 287 of micropad elements and displayed in the CAD window 280 includes distributors 282, connectors 284, reactors/pumps 286, chambers, flow control elements 288. The library may include timers and proprietary design libraries. As shown in the layout editor 289 in FIG. 2C, layer 2 is undergoing editing, while layers 1, 3 and 4 are shown below in a reduced size and are accessible for editing.

Figure 2D:
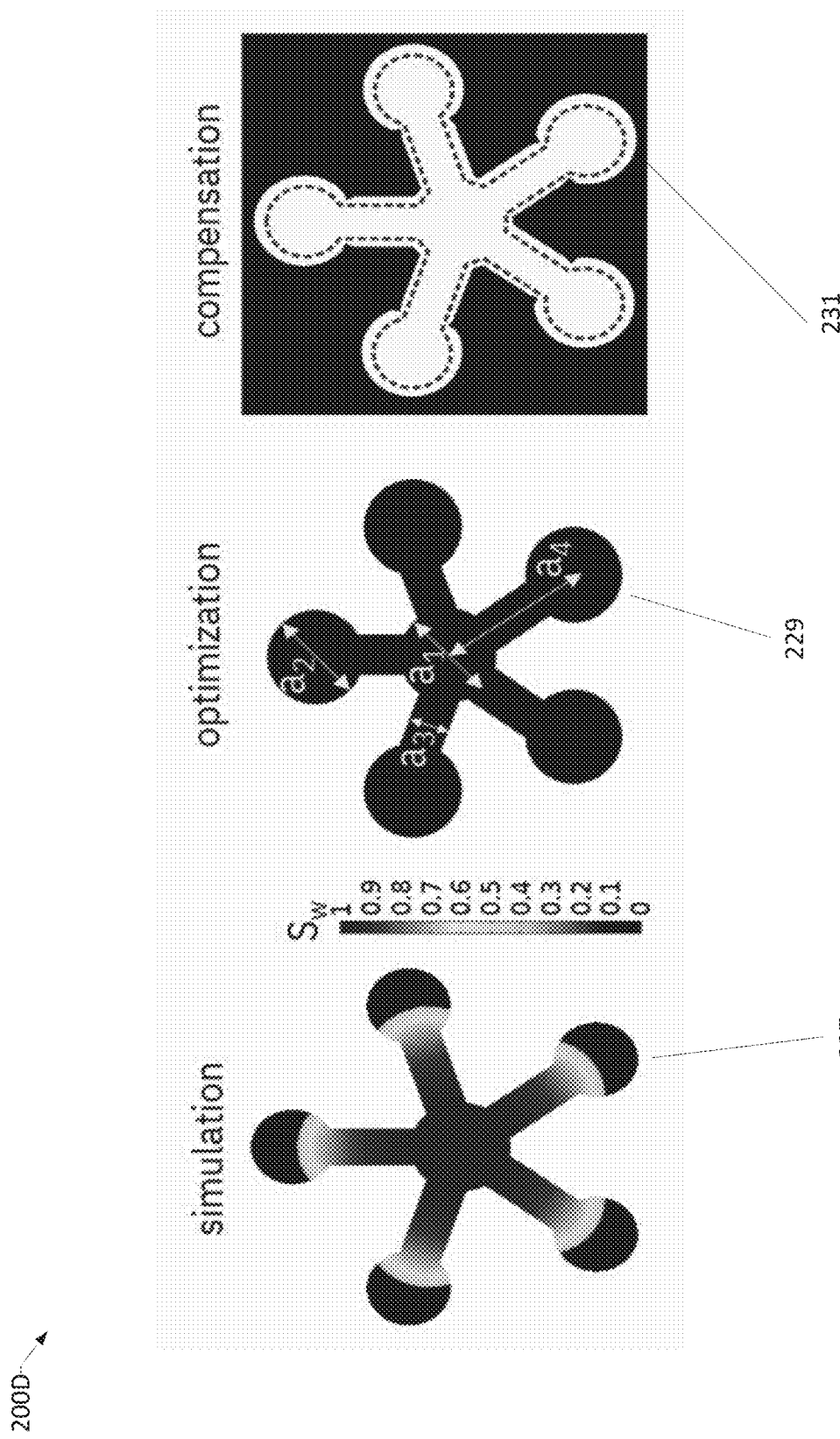
FIG. 2D is an illustrative example of the micropad design being processed by the simulation and optimization tool, consistent with an illustrative embodiment.

The simulation and optimization tool 120 shown in this embodiment in FIG. 1 is comprised of three tools or modules intended to help adjust the microfluidic device candidate elements to achieve the desired micropad blueprint. FIG. 2D illustrates an example 200D of micropad design as being processed by the three modules comprising the simulation and optimization tool, the result 227 of the flow simulation module, the parameterization 229 produced by the optimization module and the resulting geometry 231 after the reflow compensation module, consistent with an illustrative embodiment.

Figure 2E:
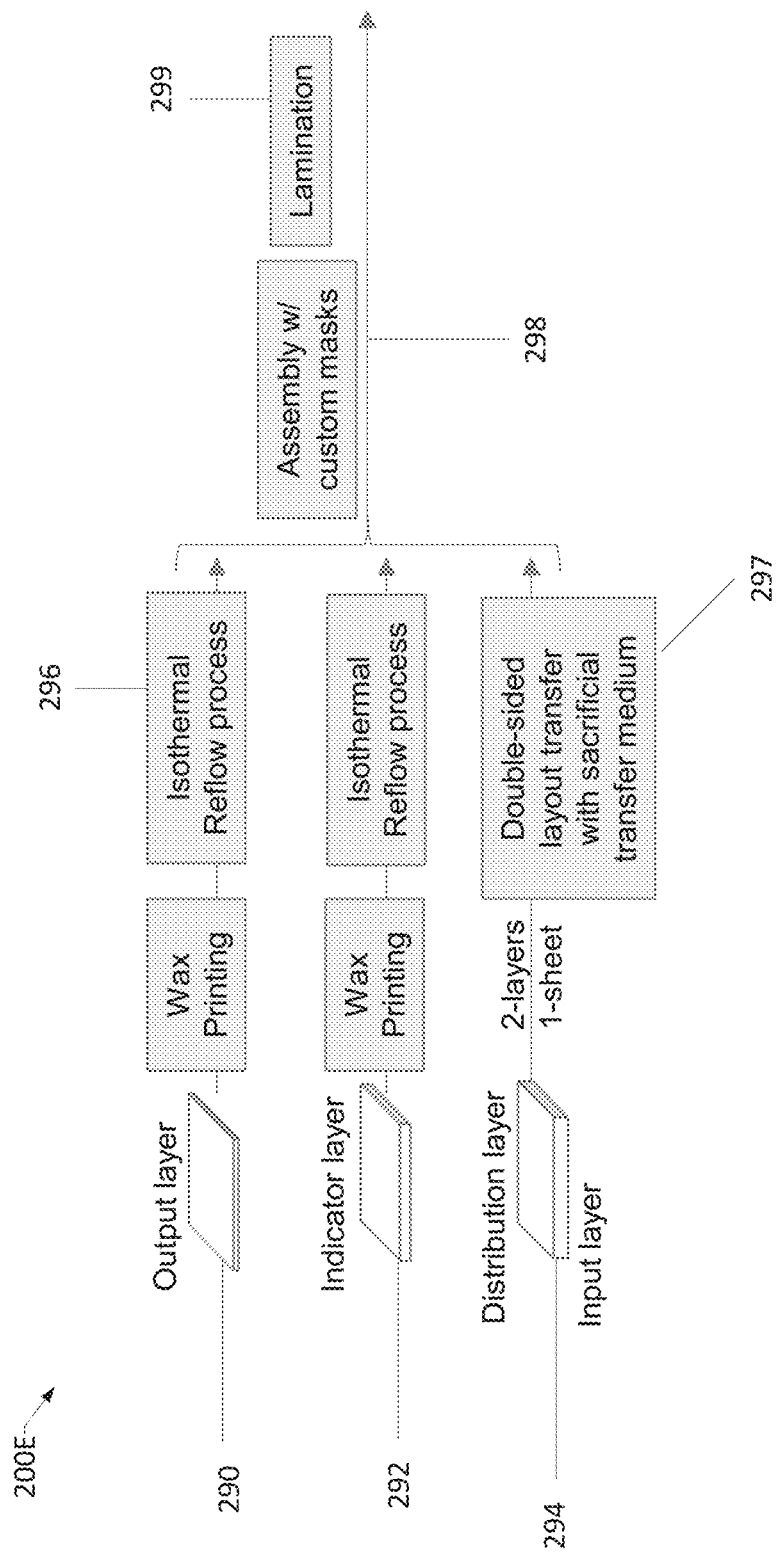
FIG. 2E illustrates an example of a fabrication and assembly recipe performed by the fabrication and assembly recommendation tool, consistent with an illustrative embodiment.

FIG. 2E shows an example of a fabrication and assembly recipe 200E performed by the fabrication and assembly recommendation tool 125, consistent with an illustrative embodiment. The output of the fabrication and assembly recommendation tool 125 includes a recommended sequence of micropad fabrication steps and an assembly recipe that includes, for example, techniques including wax printing, lithographic exposure, paper cutting, spray adhesive, layout transfer with sacrificial transfer medium, double-sided layout transfer, isothermal reflow process, assembly with custom masks, application of protective layer, etc.

For example, for the output layer 290, it is recommended that wax printing and isothermal reflow process 292 be performed, and the same operation be performed for the indicator layer 293. An Isothermal reflow process refers to a custom method of wax reflow where the hydrophilic substrate, previously patterned with a hydrophobic layout, is placed inside thermally reflective material protected with sacrificial absorbing material for enhanced and uniform reflow heat distribution. The input layer and the distribution layer 294 comprises two layout layers on one sheet, placed on either side of the paper sheet, and a double-sided layout transfer with sacrificial transfer medium method 297 is recommended. Double-sided layout transfer with sacrificial transfer medium refers to a custom method of transferring a hydrophobic pattern into the hydrophilic substrate material in which a wax (or other hydrophobic material) design is output from a printer to an intermediate surface, and the design is transferred from the intermediate surface to a substrate (e.g., paper) through a heating step that enables creating hydrophobic barriers within arbitrary types of substrates (e.g., varying thickness and/or varying porosity). Double-sided layout transfer refers to the patterning or transferring of different hydrophobic layouts on either side of the substrate layer. An assembly operation with custom masks 298, and a lamination process 299 is recommended to fabricate the finished device. Assembly with custom masks 298 refers to the method of applying adhesive to the substrate layers previously patterned with a hydrophobic wax layout, where a customized mask is applied to cover and protect hydrophilic portions of the substrate from becoming hydrophobic due to contamination by the adhesive spray. The mask is separated from the substrate before two adjacent layers are stacked together to form a 3D multi-layer micropad stack. The lamination process 299 refers to the application of a protective coating over the output layer surface of the micropad to improve the uniformity of colorimetric output and reduce evaporation effects.

Figure 3A:
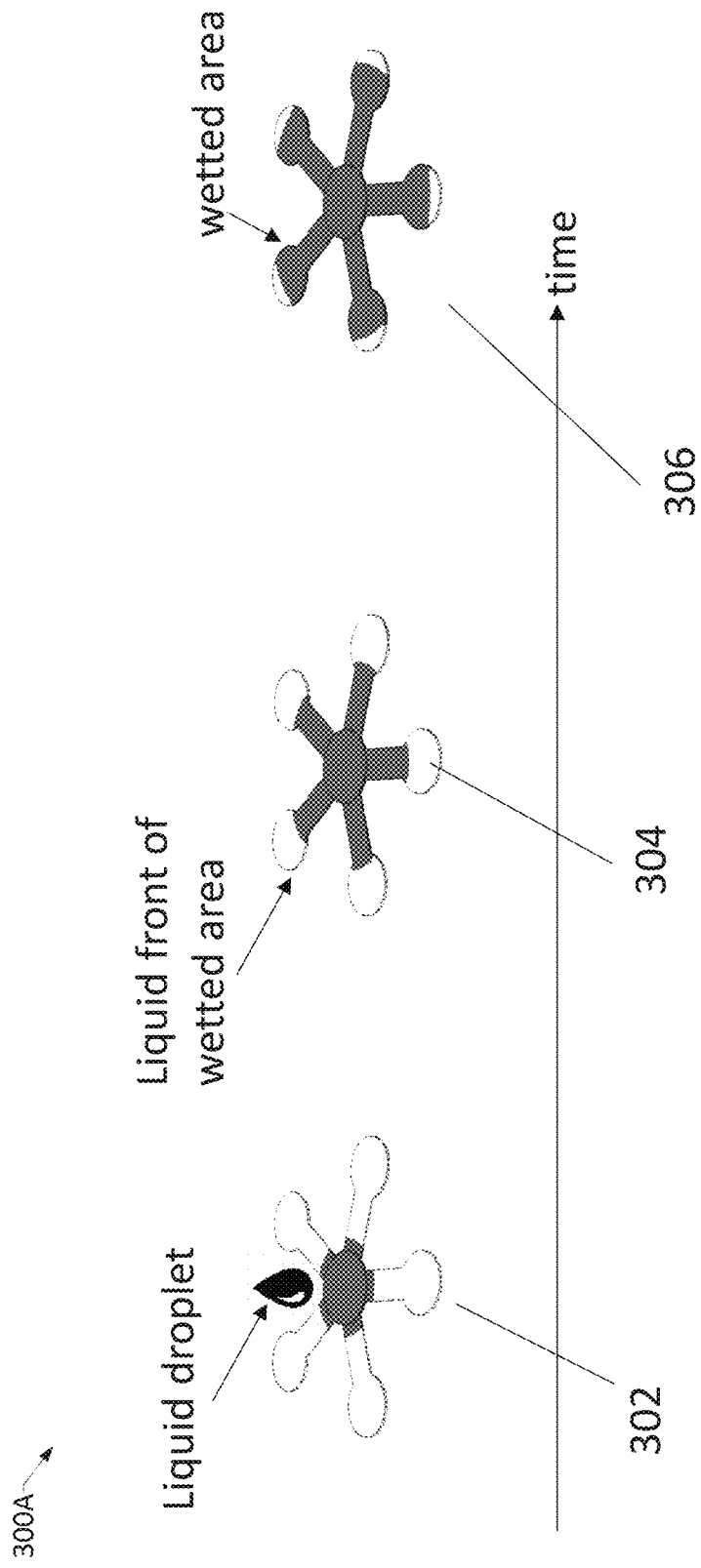
FIG. 3A illustrates some examples of flow simulations versus time in view of a paper channel geometry consistent with an illustrative embodiment.

FIG. 3A illustrates some examples of flow simulations versus time 300A in view of, for example, paper channel geometry as produced by the simulator module of the simulation and optimization tool 120. At 302 a liquid droplet of a simulated sample is input, and a liquid front and a wetted area 304 are simulated. The simulation results shows the wetted area in a darker color so it can be seen how the simulated fluid sample flows through any channel geometry with various types of papers from the classified material database.

Figure 3B:
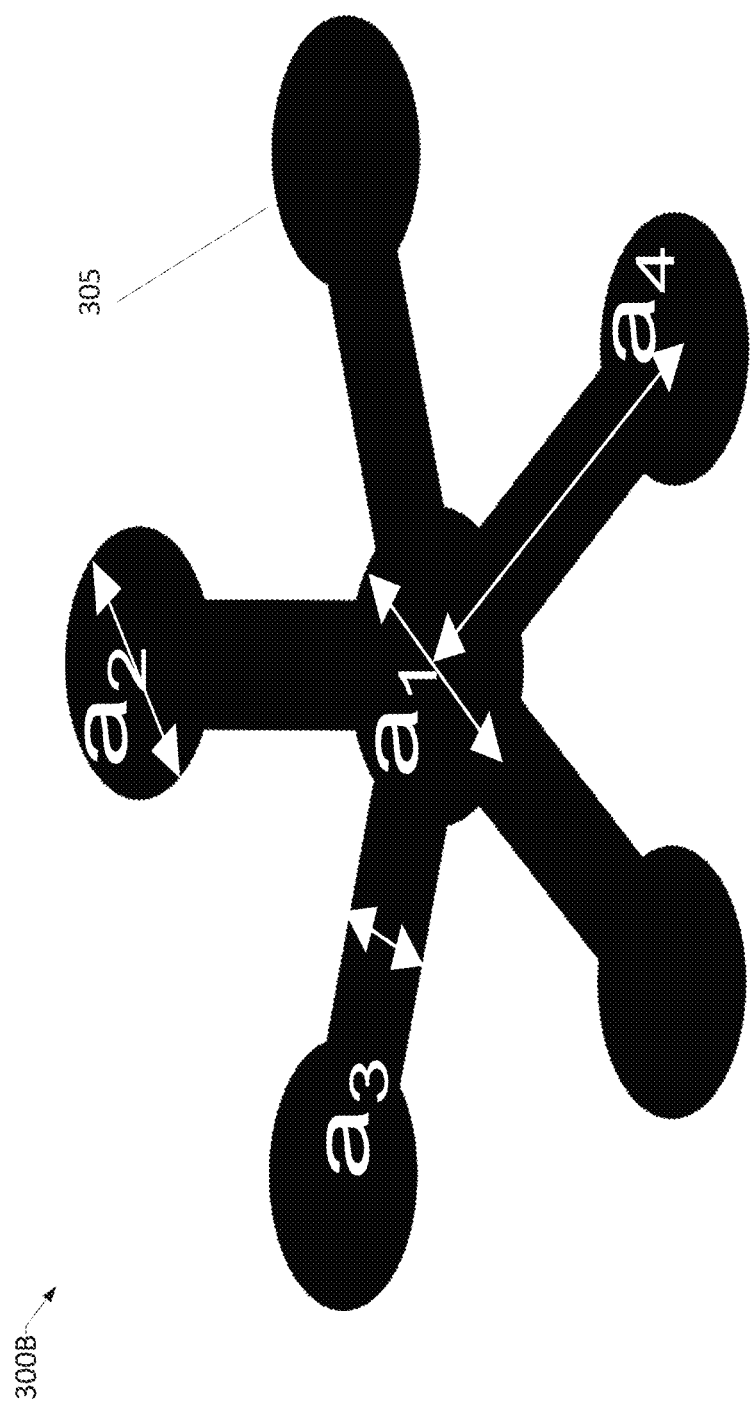
FIG. 3B illustrates an example of device parameterization, consistent with an illustrative embodiment.

FIG. 3B shows an example of device parameterization 300B produced by the optimization module, which is part of the simulation and optimization tool 120, to optimize dimensions $a_1$, $a_2$, $a_3$, and $a_4$ of the layer 305 based on the flow simulations performed by the simulator module, consistent with an illustrative embodiment.

The optimization module is configured to perform device parameterization of the microfluidic candidate elements determined for implementation with the proposed substrate-based microfluidic device. The simulation module performs flow simulations of liquid transport through the porous paper fibers using material specification such as stored in the classified material database 252 (see FIG. 2B).

The simulation and optimization tool 120 of FIG. 1 is also configured to perform reflow compensation, particularly in the case of wax-based micropads. For example, as shown in FIG. 2D, there is a simulation 227, an optimization 229 and a compensation 231 of the micropad design 200D. In a paper-based microfluidic device, the hydrophobic barriers may comprise wax. Given a wax design, during the construction of the micropad, the reflow process uses heat (e.g. from a hot press) to melt and impregnate the paper with the wax to form the hydrophobic barriers. In the process, diffusion also occurs on the plane of the paper, which can slightly deform and shrink the paper channels.

Figure 3C:
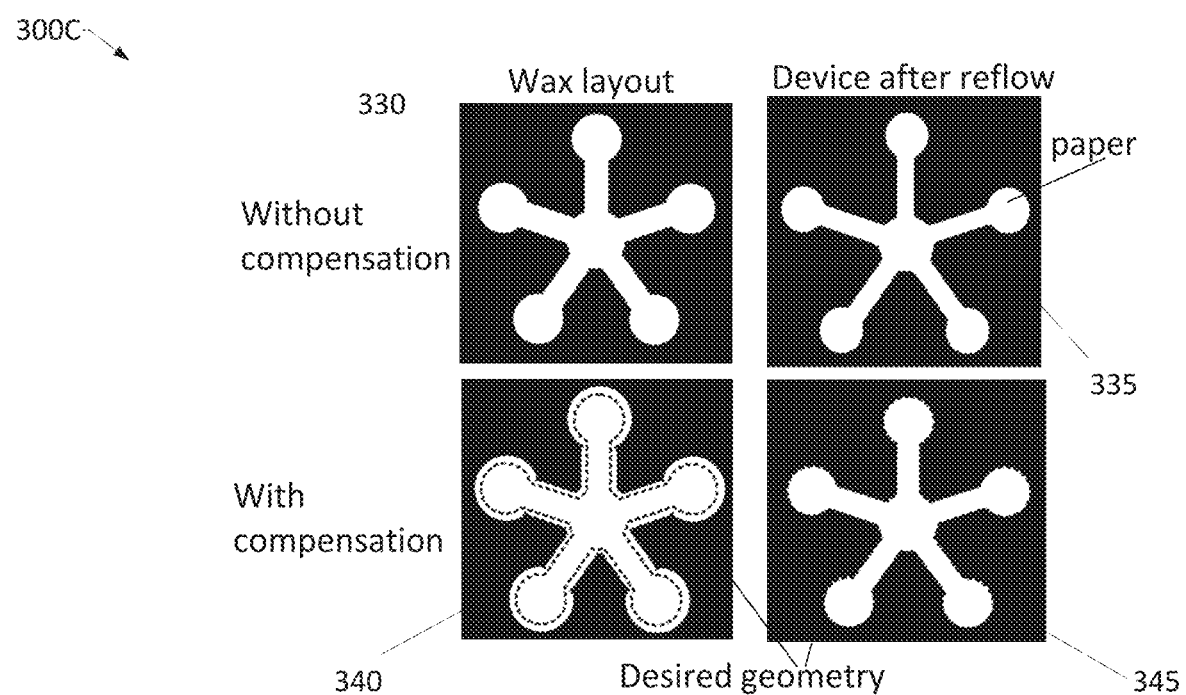
FIG. 3C illustrates an example of the effect of reflow in the pattern of the hydrophobic barrier and of reflow compensation workflow consistent with an illustrative embodiment.

Referring to FIG. 3C, an example of the effect of reflow 300C is first provided in the pattern of the hydrophobic barrier. The effect of reflow during the hot pressing process results in the hydrophobic barrier design 330 having a resultant shape after reflow as shown in the image in 335. It can be seen that the various geometric shapes corresponding to the hydrophilic paper channels are smaller than their original planned size. Micropads will have results that are skewed because of the effects of reflow, which denigrates their performances as an analytical device.

With continued reference to FIG. 3C, pattern 330 (without compensation) and its resultant geometric configuration after reflow 335 are shown. In addition, item 340 shows a compensated geometric configuration utilizing the reflow compensation module 231 (FIG. 2D) of the simulation and optimization tool 120 according to the present disclosure. It can be seen that in 340, the hydrophilic channels are designed to be larger than the desired geometry so that at 345 the desired geometry is realized after reflow. The simulation and optimization tool 120 is configured to recommend the compensated dimensions based on the porosity of the paper, type of wax, temperature of reflow machine, so that the desired geometry is achieved after the reflow of the wax.

The fabrication and assembly recommendation tool 125 is configured to output a design blueprint of the proposed substrate-based microfluidic device based on the device optimization and compensation performed by the simulation and optimization tool 120. The fabrication and assembly recommendation tool 125 is operatively coupled to a library of micropad fabrication methods and techniques classified according to their recommended application and expected outcomes. The library may include both public and proprietary construction techniques and geometries.

Figure 4A:
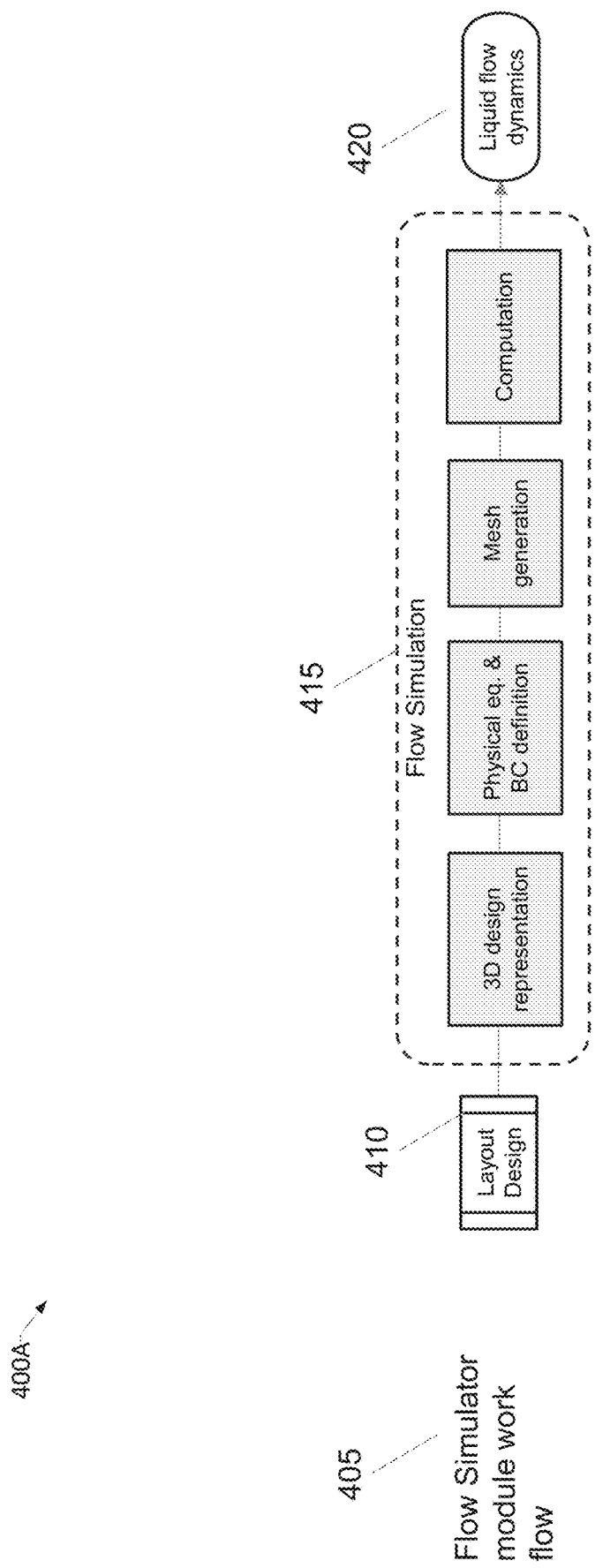
FIG. 4A illustrates a flow simulation workflow within the simulation and optimization tool, consistent with an illustrative embodiment.
Figure 4B:
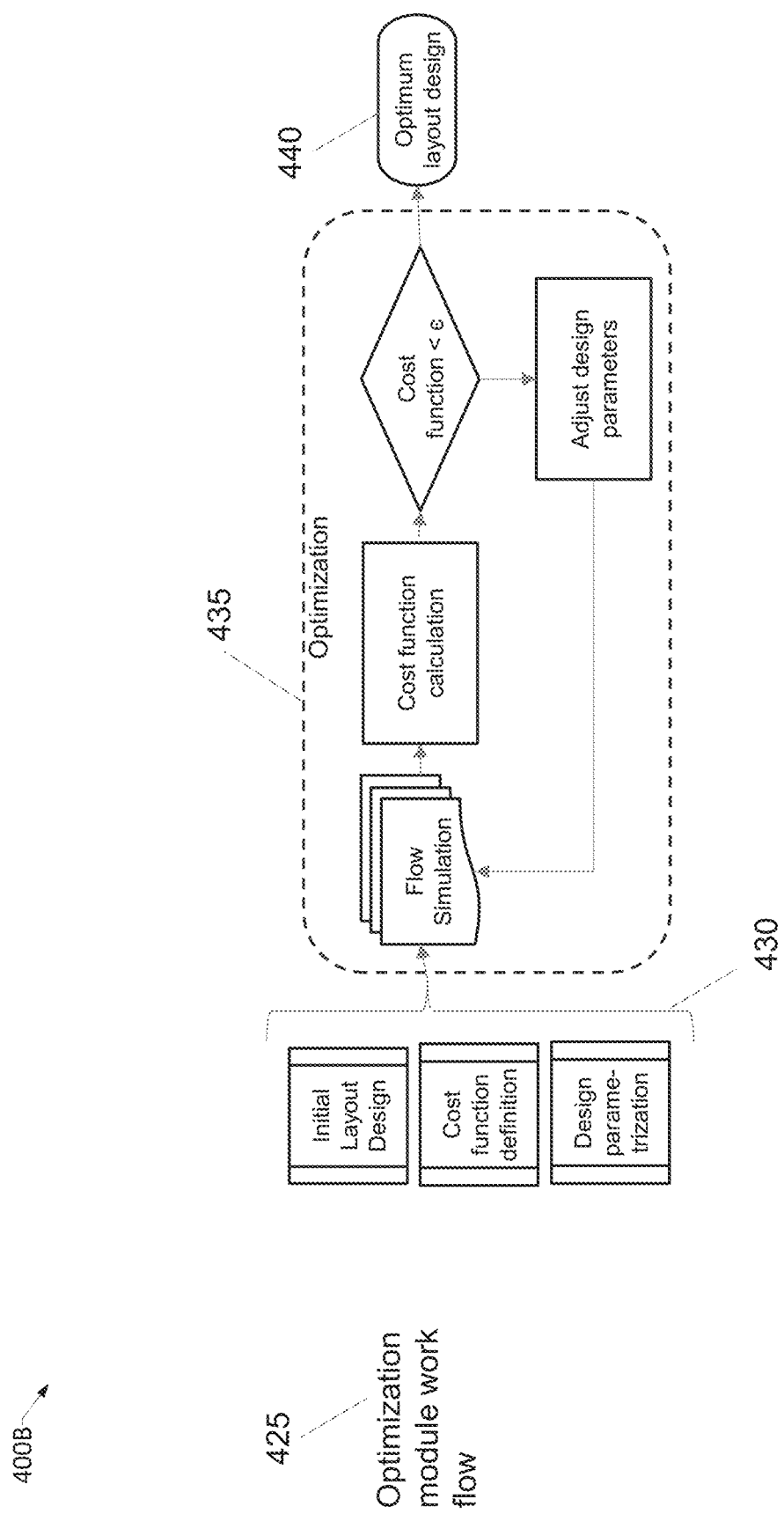
FIG. 4B illustrates an optimization workflow within the simulation and optimization tool, consistent with an illustrative embodiment.
Figure 4C:
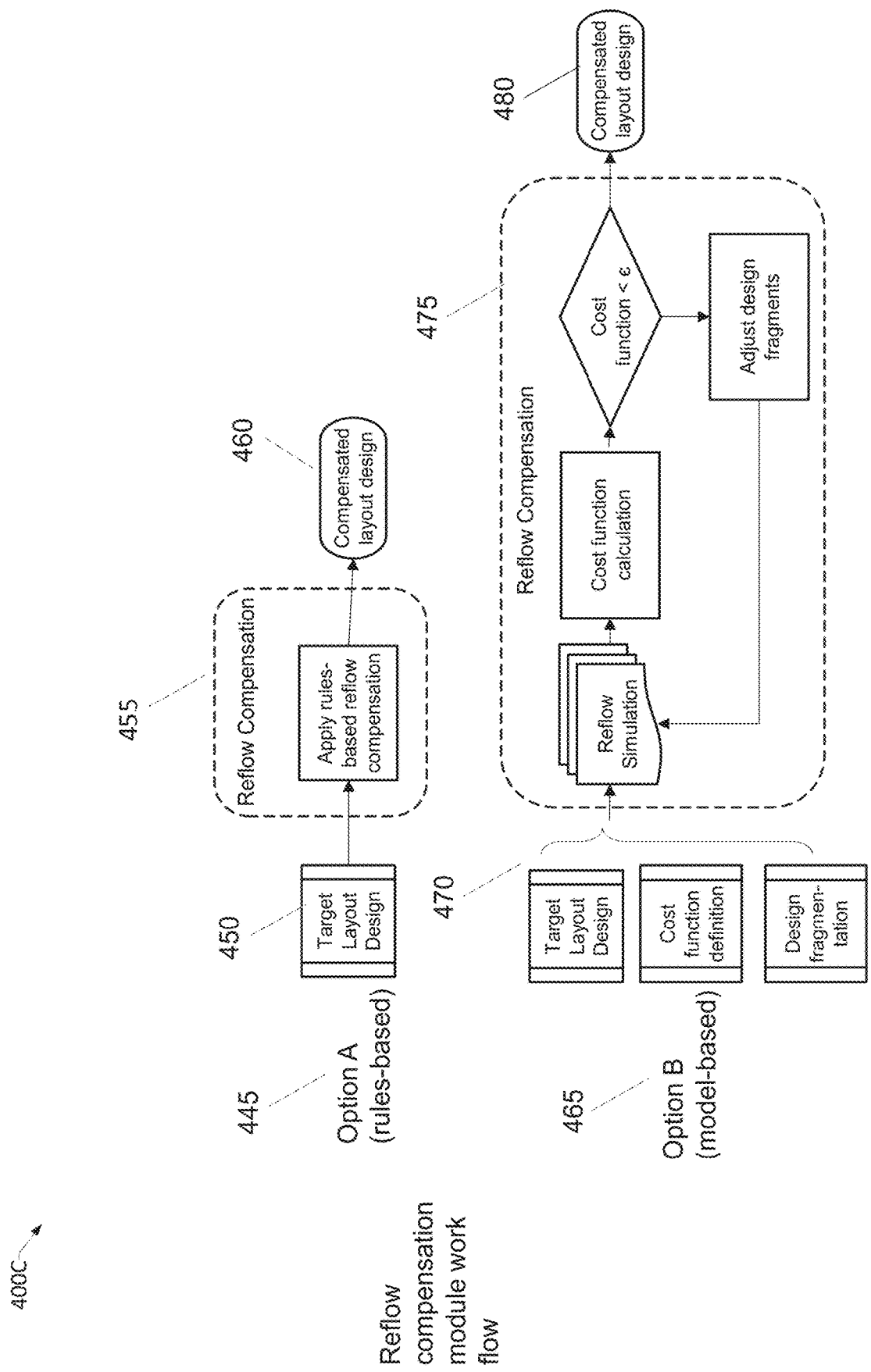
FIG. 4C illustrates two options for reflow compensation workflow within the simulation and optimization tool, consistent with an illustrative embodiment.

FIGS. 4A, 4B and 4C illustrate various workflows by the simulation and optimization tool 120 consistent with an illustrative embodiment. FIG. 4A shows in 400A a flow simulation module workflow 405. FIG. 4B shows in 400B an optimization module workflow 425. FIG. 4C shows in 400C two possible reflow compensation module workflows 445 and 465, respectively.

The flow simulation workflow 415 shown in FIG. 4A includes consideration of a layout design 410, various properties such as 3D design representation, physical equations and boundary conditions definition, mesh generation, and numerical computation to simulate liquid flow dynamics 420.

FIG. 4B shows the optimization module workflow 425 also considers cost function definition, initial design layout and design parameterization 430. The optimization module workflow 435 iteratively adjusts design parameters to optimize the design layout 440 of a paper-based microfluidic device to minimize the cost function with regard to flow simulations.

FIG. 4C shows a rules-based reflow compensation module workflow 445 and a model-based reflow compensation module workflow 465. Rules-based reflow compensation 455 considers the initial design layout 450 of the device and adjusts the dimensions according to a set of table entries related to expected reflow effect to produce a compensated layout design 460. Model-based reflow compensation 465 also considers a target design layout, cost function definition, and design parameterization 470. The reflow compensation workflow 475 then iteratively adjusts design parameters to optimize the design layout 450 of a paper-based microfluidic device to minimize the cost function with regard to reflow simulations and produce a compensated layout design 480 that will result in the target geometry after the reflow process.

Figure 5:
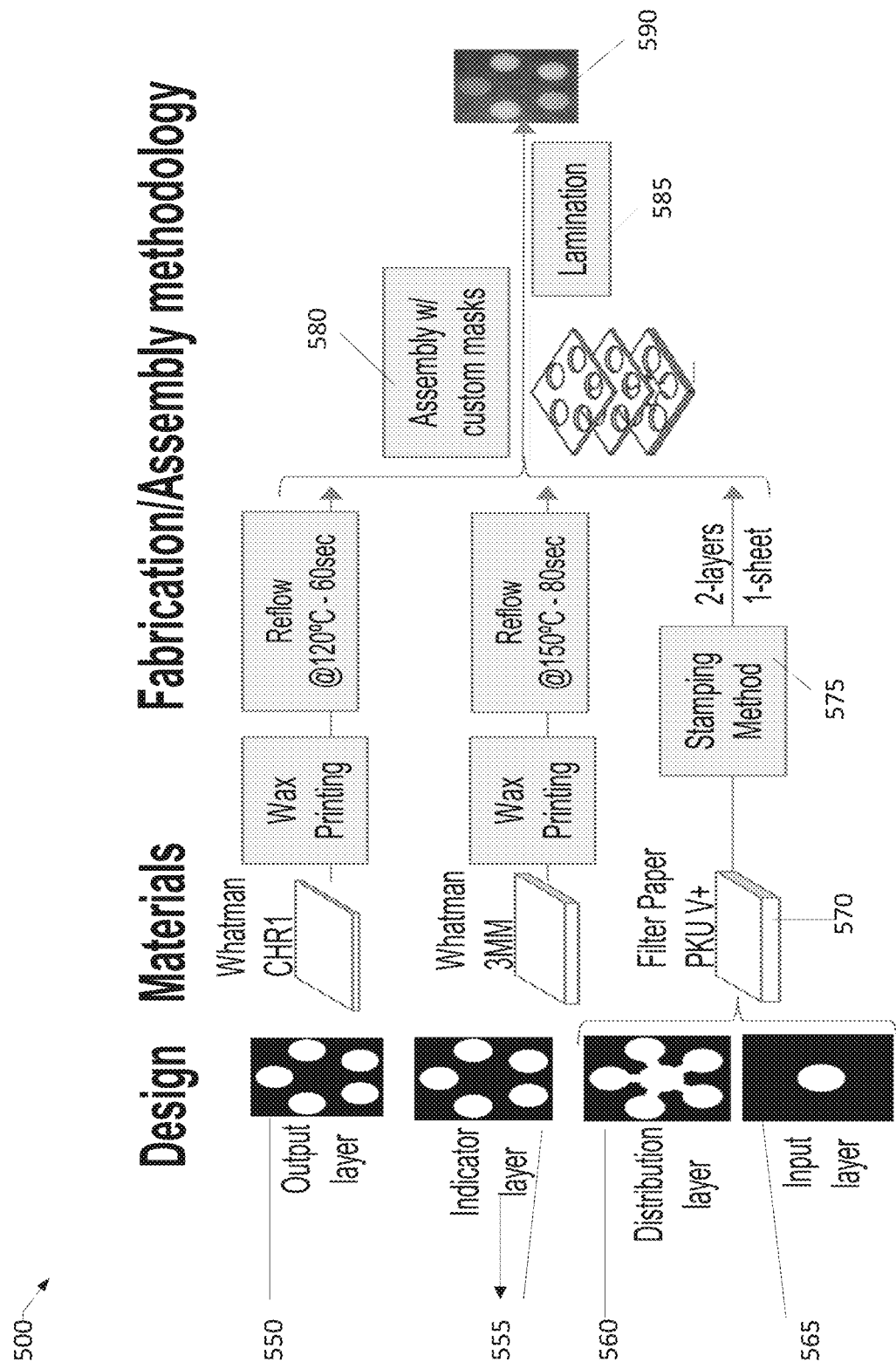
FIG. 5 shows an example of the design blueprint of the micropad device output by the design and prototyping platform, consistent with an illustrative embodiment.

FIG. 5 shows an example of the design blueprint output 500 of a 3D micropad device by the design and prototyping platform 101, consistent with an illustrative embodiment. The design blueprint includes a device paper multi-layer stack comprising an output layer 550, indicator layer 555, distribution layer 560, and an input layer 565 and corresponding layouts as shown along the left. With reference to FIG. 5, there is a recommendation of paper materials 570 for each layer, a recommendation of a fabrication method for each layer 575 (wax printing, isothermal reflow temperatures and time etc.). In addition, a recommendation of assembly recipe 580 (adhesive application with custom masks) is shown. A lamination operation 585 is recommended as the last operation of the fabrication and assembly recipe with a figure of an exemplary final device 590 being shown. The final device 590 is just one of many possible examples of a micropad constructed according to a design blueprint consistent with an illustrative embodiment. The final device 590 in this illustrative embodiment has been constructed by compensating for/modifying the design due manufacturing effects (e.g., wax reflow).

Example Processes

Figure 6:
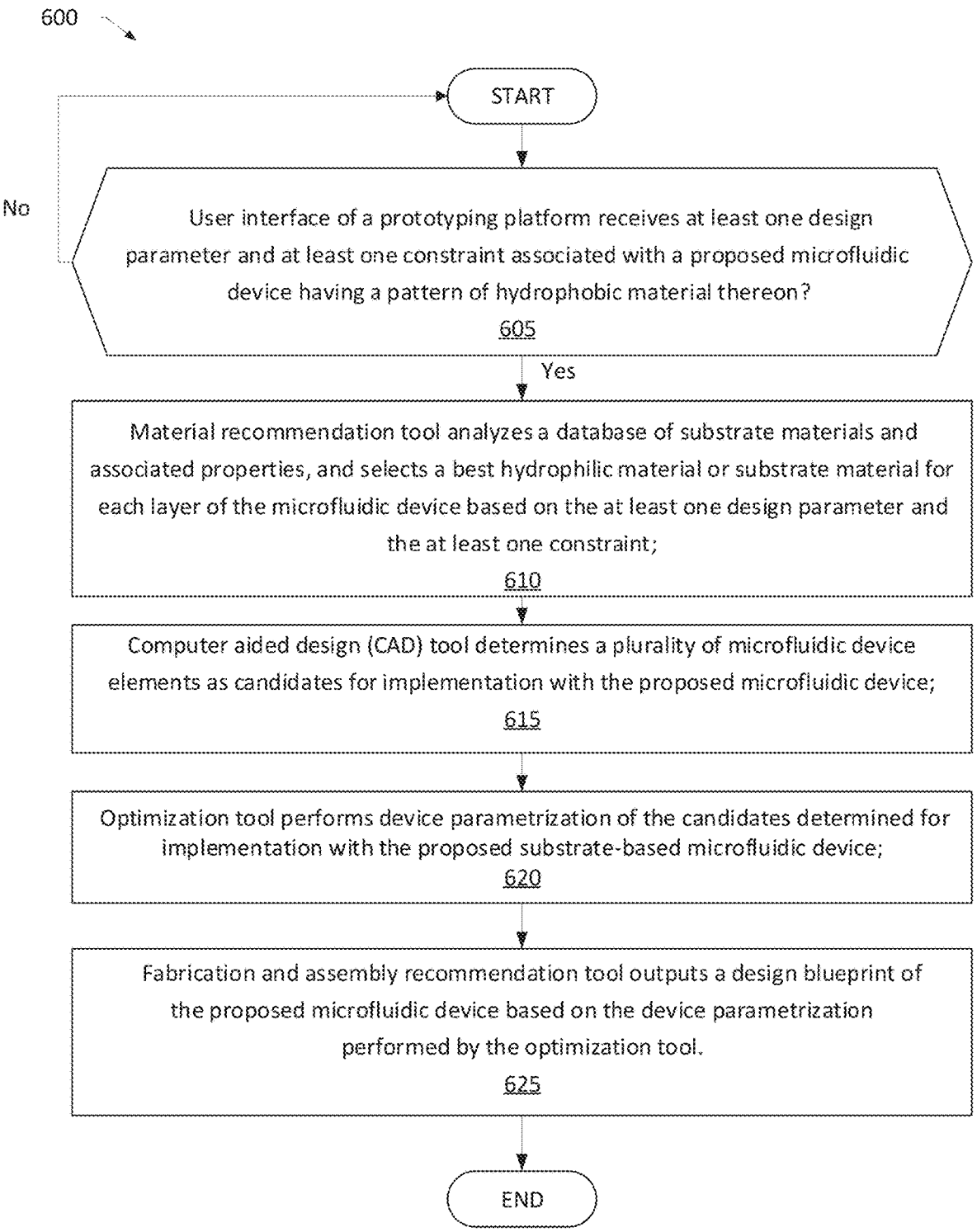
FIG. 6 is an example flowchart of a process for creating a design blueprint, consistent with an illustrative embodiment.

With the foregoing overview of the example architecture and conceptual block diagram of a system 100 shown in FIG. 1, it may be helpful now to consider a high-level discussion of example processes. To that end, FIG. 6 presents an illustrative process related to various aspects of the present disclosure. Process 600 is illustrated as a collection of blocks in a logical flowchart, which represent a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 600 is described with reference to the architecture of FIG. 1.

At operation 605, the process begins when it is determined that user interface 105 of a prototyping platform 101 receives at least one blueprint parameter and at least one constraint associated with a proposed microfluidic device having a pattern of hydrophobic material thereon.

At operation 610, the material recommendation tool 110 analyzes a database of substrate materials and associated properties, and selects an optimum hydrophilic material type for each layer of the microfluidic device based on the at least one blueprint parameter the at least one constraint.

At operation 615, a computer-aided design (CAD) tool 115 determines a plurality of microfluidic device elements as candidates for implementation with the proposed microfluidic device.

At operation 620, the simulation and optimization tool 120 performs device optimization of the microfluidic candidates determined for implementation with the proposed substrate-based microfluidic device.

At operation 625, the fabrication and assembly recommendation tool 125 outputs a design blueprint 130 of the proposed microfluidic device based on the device optimization performed by the simulation and optimization tool 120. The blueprint 130 may include some or all of the items shown, for example, in FIG. 5. There may be the design of each layer such as the output layer, indicator layer, distribution layer, and input layer. Optionally, there may also be recommendations for paper materials and fabrication and assembly recipes such as shown in FIG. 5. It will be understood that the design blueprint of the layers of the micropad may include instructions for a wax printer, a 3D printer, reflow device or hot press, for example, to construct the micropad.

Computer Program Product

Numerous other embodiments are also contemplated. These include embodiments that have fewer, additional, and/or different components, steps, features, objects, benefits and advantages. These also include embodiments in which the components and/or steps are arranged and/or ordered differently.

The present application may be a system, a method, and/or a computer program product. The computer program product may include a computer-readable storage medium (or media) having computer readable program instructions thereon for causing a processor to carry out aspects of the present application.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a specifically configured computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions. As discussed above, functions relating to the present disclosure can be performed with the use of one or more computing devices connected for data communication via wireless or wired communication, for example, in accordance with the process 600 of FIG. 6.

Figure 7:
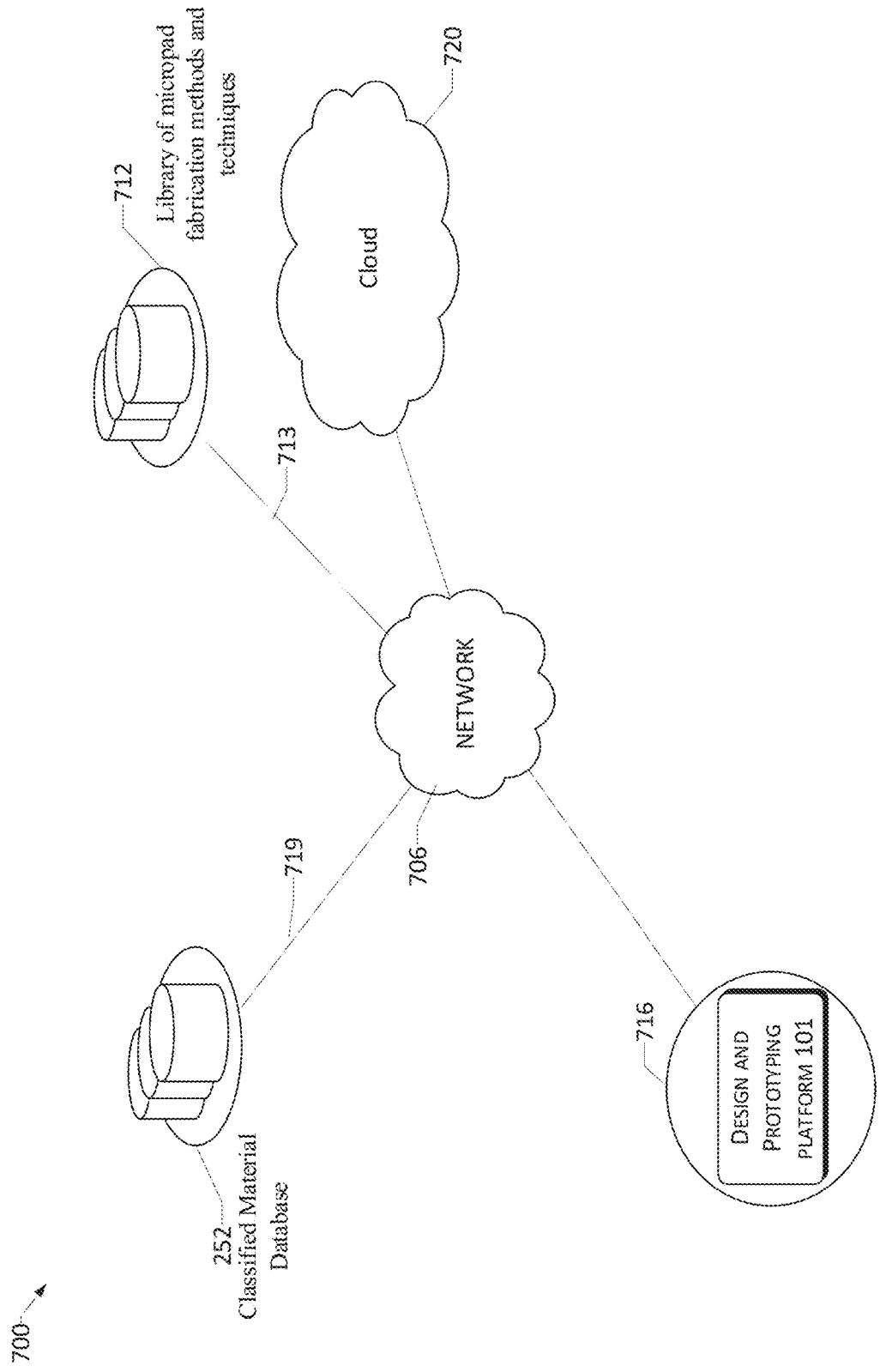
FIG. 7 depicts a network environment, consistent with an illustrative embodiment.

FIG. 7 depicts a network environment, consistent with an illustrative embodiment. With reference to FIG. 7, there is shown the design and prototyping platform 716 of the present disclosure as discussed hereinabove, the classified material database 252, and a library of micropad fabrication methods and techniques 712 as discussed regarding operation of the fabrication and assembly recommendation tool 125, all of which can communicate via the network 706. Cloud 720 is also coupled with the network 706 and may be configured to transfer data to/from the classified material data base 252.

Example Computer Platform

Figure 8:
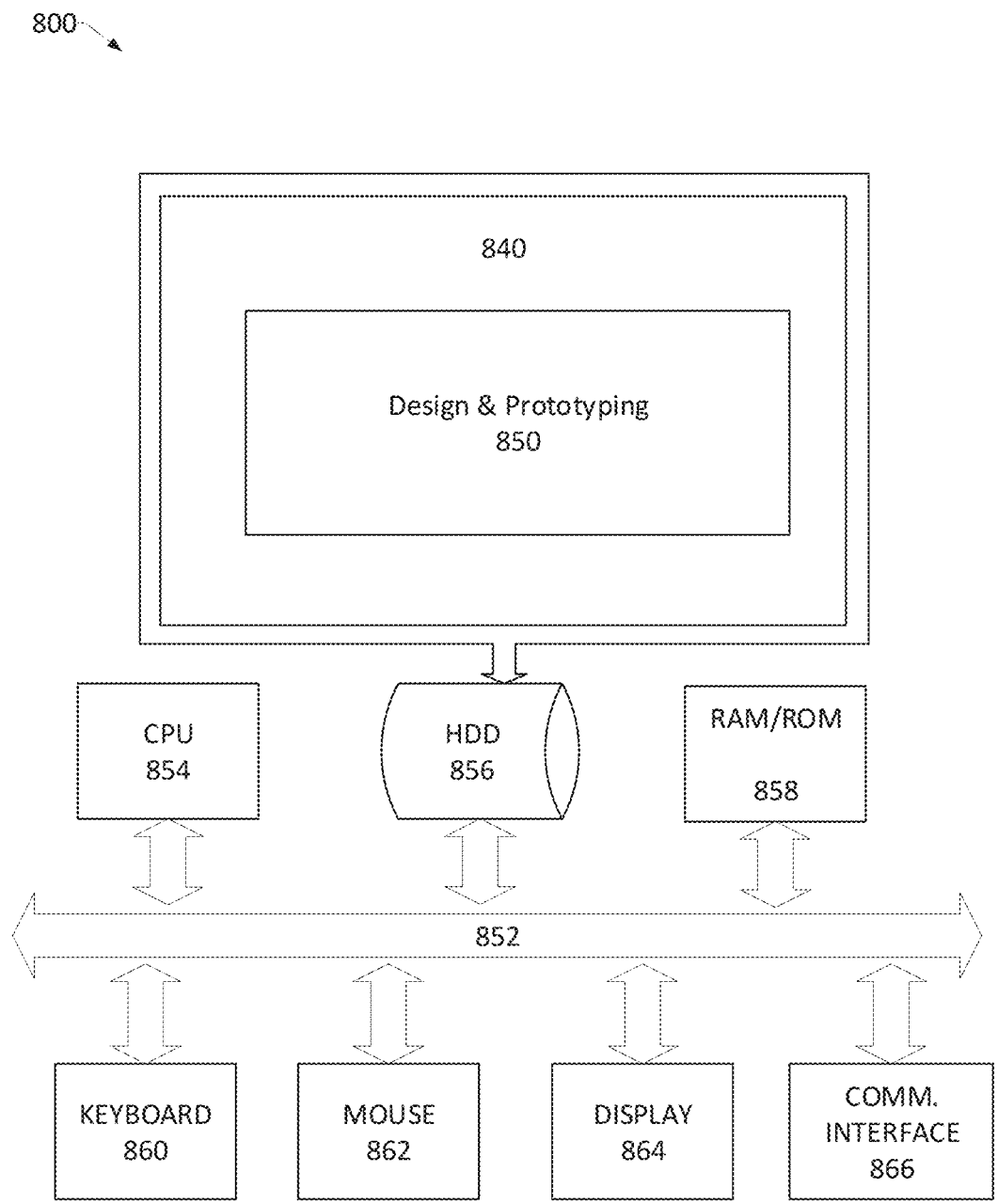
FIG. 8 is a functional block diagram illustration of a computer hardware platform that can communicate with various networked components, consistent with an illustrative embodiment.

FIG. 8 provides a functional block diagram illustration of a computer hardware platform that is capable of communicating with a network according to the present disclosure. With reference to FIG. 8, the computer platform 800 may include a central processing unit (CPU) 854, a hard disk drive (HDD) 856, random access memory (RAM) and/or read-only memory (ROM) 858, a keyboard 860, a mouse 862, a display 864, and a communication interface 866, which are connected to a system bus 852.

In one embodiment, the HDD 856, has capabilities that include storing a program that can execute various processes, such as the design and prototyping platform 850, in a manner described herein. The design and prototyping platform 850 may have various modules configured to perform different functions as shown in FIG. 1 and discussed herein above.

In one embodiment, a program, such as Apache™, can be stored for operating the system as a Web server. In one embodiment, the HDD 856 can store an executing application that includes one or more library software modules, such as those for the Java™ Runtime Environment program for realizing a JVM (Java™ virtual machine).

Example Cloud Platform

It is to be understood that although this disclosure includes a detailed description on cloud computing, implementation of the teachings recited herein are not limited to a cloud computing environment. Rather, embodiments of the orient disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 9:
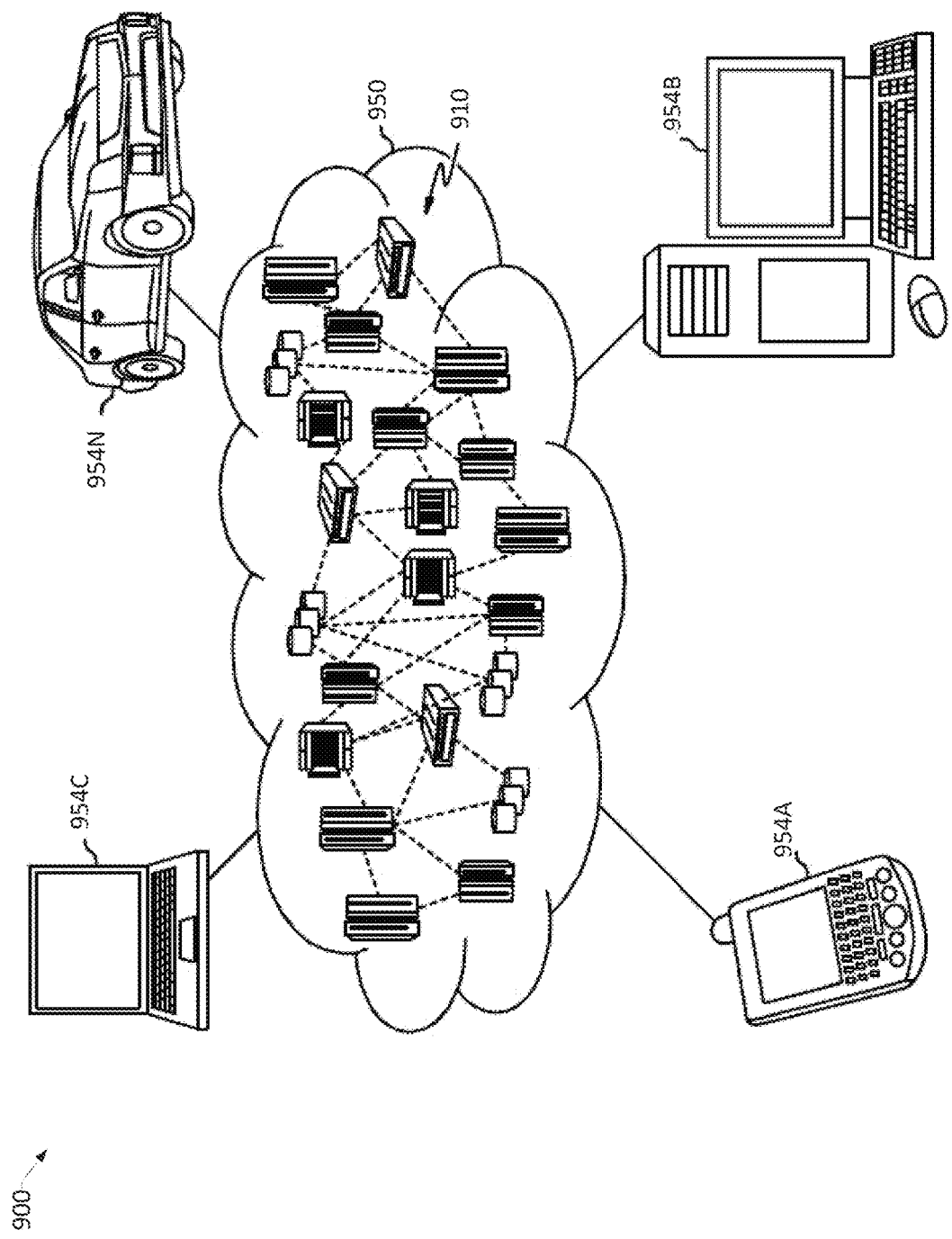
FIG. 9 depicts a cloud computing environment, consistent with an illustrative embodiment.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
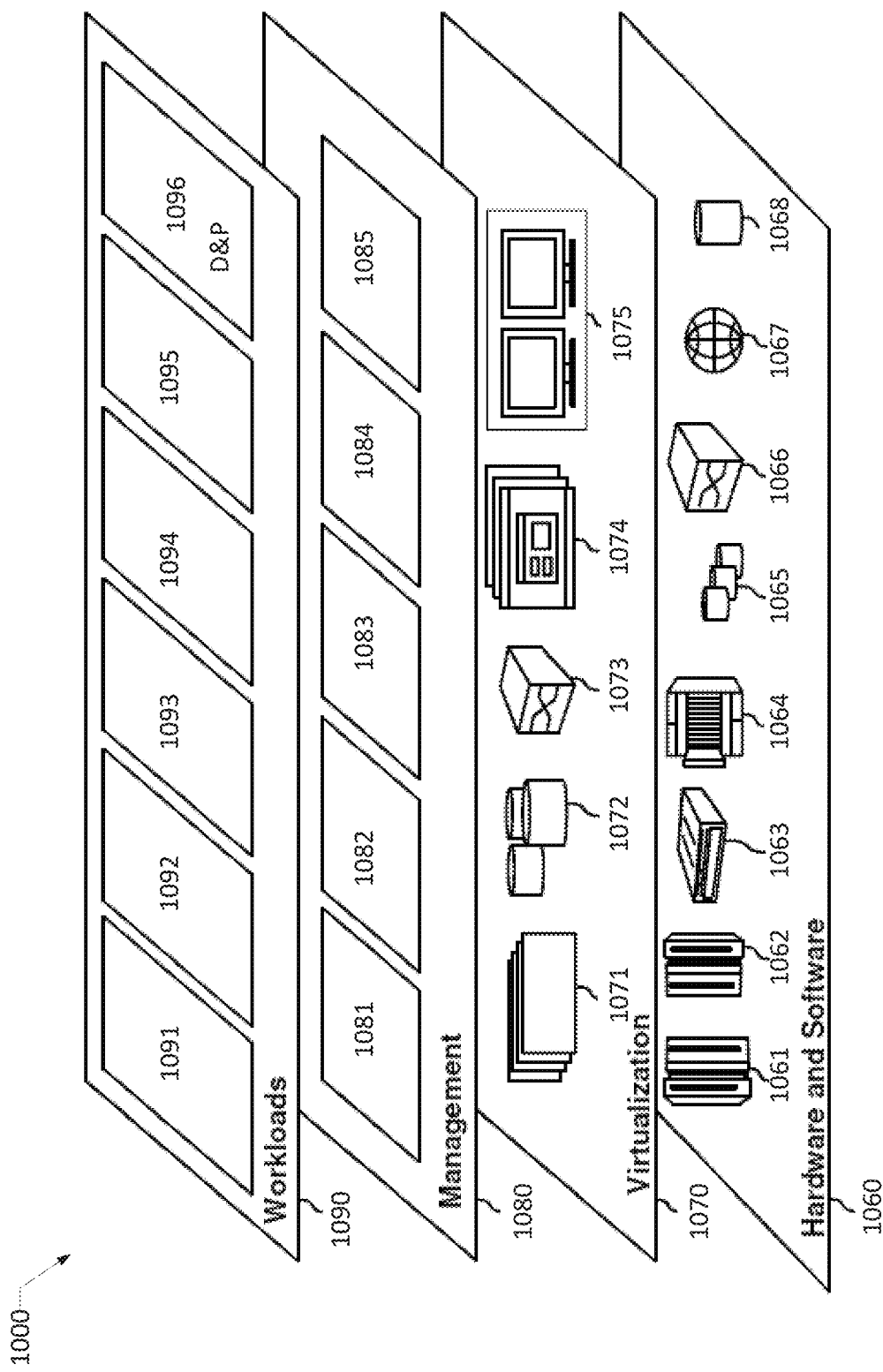
FIG. 10 depicts abstraction model layers, consistent with an illustrative embodiment.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a design and prototyping platform 1096, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of creating a design blueprint for a substrate-based microfluidic device by a design and prototyping platform, the method comprising:
   receiving at least one blueprint parameter comprising a detection type or a sample type, and at least one constraint comprising a reagent volume limit associated with a proposed substrate-based microfluidic device including a hydrophilic material and an arrangement of a pattern of a hydrophobic material;
   determining an arrangement of a plurality of microfluidic device elements as candidates for implementation of the proposed substrate-based microfluidic device;
   performing, by a simulation and optimization tool, a device parametrization and computer simulation of the candidates determined for implementation of the proposed substrate-based microfluidic device that includes a recommendation of the microfluidic elements as candidates and design dimensions by performing flow simulations of liquid transport through porous paper fibers of the hydrophilic paper of a microfluidic paper-based analytical device (micropad); and
   automatically outputting a design blueprint of the proposed substrate-based microfluidic device based on the at least one blueprint parameter, the determined arrangement, and the device parametrization and computer simulation.

2. The computer-implemented method according to claim 1, wherein the hydrophilic material comprises paper, the method further comprising:

selecting, by a material recommendation tool configured to analyze a database of substrate materials and associated properties, a paper type for the substrate-based microfluidic device that most closely accommodates the at least one blueprint parameter and the at least one constraint.

3. The computer-implemented method according to claim 1 further comprising:

arranging, by a computer-aided design (CAD) tool, the candidates for implementation of the proposed substrate-based microfluidic device.

4. The computer-implemented method according to claim 1, further comprising:

performing, by the simulation and optimization tool, a device parametrization and computer simulation of the candidates determined for implementation of the proposed substrate-based microfluidic device.

5. The computer-implemented method according to claim 4, wherein the device parametrization and optimization performed by the simulation and optimization tool further comprises recommending microfluidic elements as the candidates determined for implementation with the substrate-based microfluidic device based on the computer simulation.

6. The computer-implemented method according to claim 1, wherein the design blueprint comprises information to construct the microfluidic paper-based analytical device (micropad) having one or more layers of a hydrophilic paper with hydrophobic barriers arranged thereon.

7. The computer-implemented method according to claim 6, wherein the design blueprint of the micropad includes at least one recommended paper material, at least one hydrophobic material layout, and at least one recommended fabrication and assembly recipe to construct the micropad.

8. The computer-implemented method according to claim 1:

wherein the at least one blueprint parameter comprises a number of inputs, a number of outputs, or a number of layers of hydrophilic paper, and wherein the at least one constraint comprises, a reaction time limit, a processing volume limit, a processing time limit, a sample volume limit or an absorption time limit.

9. The computer-implemented method according to claim 8, wherein the outputting of the design blueprint includes a recommended sequence, by a fabrication and assembly recommendation tool, of fabrication operations and an assembly recipe for construction of the microfluidic paper-based analytical device (micropad).

10. The computer-implemented method according to claim 9, further comprising:

performing a reflow simulation to predict deformation of hydrophobic barriers impregnated in the hydrophilic paper of the micropad; and compensating for a size of the hydrophobic barriers provided in the design blueprint of the micropad based on the predicted deformation.

11. A non-transitory computer readable storage medium tangibly embodying a computer readable program code having computer readable instructions that, when executed, causes a computer device having a design and prototyping platform to carry out a method of creating a design blueprint of a substrate-based microfluidic device, the method comprising:

receiving, by the design and prototyping platform, at least one blueprint parameter comprising a detection type or a sample type, and at least one constraint comprising a reagent volume limit associated with a proposed substrate-based microfluidic device including a hydrophilic material and an arrangement of a pattern of a hydrophobic material;

determining, by the design and prototyping platform, an arrangement of a plurality of microfluidic device elements as candidates for implementation of the proposed substrate-based microfluidic device;

performing, by a simulation and optimization tool, a device parametrization and computer simulation of the candidates determined for implementation of the proposed substrate-based microfluidic device that includes a recommendation of the microfluidic elements as candidates and design dimensions by performing flow simulations of liquid transport through porous paper fibers of the hydrophilic paper of a microfluidic paper-based analytical device (micropad); and automatically outputting a design blueprint of the proposed substrate-based microfluidic device based on the at least one blueprint parameter, the determined arrangement, and the device parametrization and computer simulation.

12. The non-transitory computer-readable storage medium according to claim 11, further comprising:

selecting, by a material recommendation tool configured to analyze a database of substrate materials and associated properties, a best paper type for the substrate-based microfluidic device, based on the at least one blueprint parameter and the at least one constraint.

13. The non-transitory computer-readable storage medium according to claim 11, further comprising:

arranging, by a computer-aided design (CAD) tool, the candidates for implementation of the proposed substrate-based microfluidic device; and performing, by the simulation and optimization tool, the device parametrization and optimization includes performing computational simulation and recommendation of the candidates for implementation with the substrate-based microfluidic device.

14. The non-transitory computer-readable storage medium according to claim 13, wherein outputting the design blueprint includes providing at least one recommended paper material for a microfluidic paper-based analytical device (micropad) having one or more layers of a hydrophilic paper with hydrophobic barriers arranged thereon, and wherein the design blueprint of the micropad includes a recommended fabrication and assembly recipe to construct the micropad.

15. The non-transitory computer-readable storage medium according to claim 11, wherein the at least one blueprint parameter comprises one or more of: a number of inputs, a number of outputs, or a number of layers of a hydrophilic paper, and wherein the at least one constraint comprises at least one of: reaction time limit, a processing volume limit, a processing time limit, a sample volume limit, or an absorption time limit.

16. A prototyping platform for creating a design blueprint of a microfluidic paper-based analytical device (micropad), comprising:
- a computer-aided design (CAD) tool configured to:
  - receive at least one blueprint parameter comprising a detection type or a sample type, and at least one constraint comprising a reagent volume limit associated with a proposed micropad having a number of layers of a hydrophilic material and a pattern of a hydrophobic material thereon; and
  - determine an arrangement of a plurality of microfluidic device elements as candidates for implementation of a proposed micropad; and to output a design blueprint of the proposed micropad; and
- a simulation and optimization tool configured to:
  - perform a device parametrization and computer simulation of the candidates determined for implementation with the proposed micropad, including performing computational flow simulation and recommendation of the candidates and design dimensions for implementation.

17. The prototyping platform according to claim 16, further comprising:
- a recommendation tool configured to analyze a database of hydrophilic materials and associated properties, and to select a type of a hydrophilic paper for each layer of the proposed micropad;
- wherein the optimization tool is further configured to perform reflow simulation to predict deformation of hydrophobic barriers impregnated in the hydrophilic paper of the proposed micropad and respectively pre-compensate a size of the hydrophobic barriers based on the predicted deformation of the hydrophobic barriers; and
- a fabrication and assembly recommendation tool configured to select a sequence of fabrication operations and an assembly recipe for construction of the proposed micropad, wherein the output design blueprint of the proposed micropad includes at least one material recommendation, a hydrophobic barrier layout, and a fabrication and assembly recipe.

18. The prototyping platform according to claim 17:
- wherein the fabrication and assembly recommendation tool is configured to output the design blueprint to a fabrication device configured to arrange the pattern of the hydrophobic material on the proposed micropad; and
- wherein the fabrication and assembly recommendation tool is configured to include in the design blueprint a recommended sequence of fabrication operations and an assembly recipe for construction of a three-dimensional micropad comprising a plurality of tiers of one or more types of hydrophilic material.

* * * * *